May 23, 1967 T. J. BOLLING, JR 3,321,176
CLOSED FLUID SYSTEM FOR SEALING VALVE CLOSURE ELEMENTS
Filed Aug. 2, 1965 2 Sheets-Sheet 1

Thomas J. Bolling, Jr.
INVENTOR.

BY Hayden & Pravel
ATTORNEYS

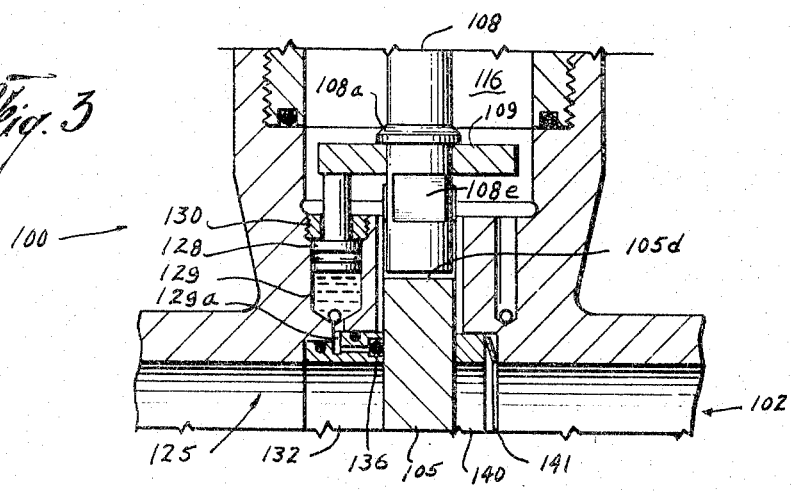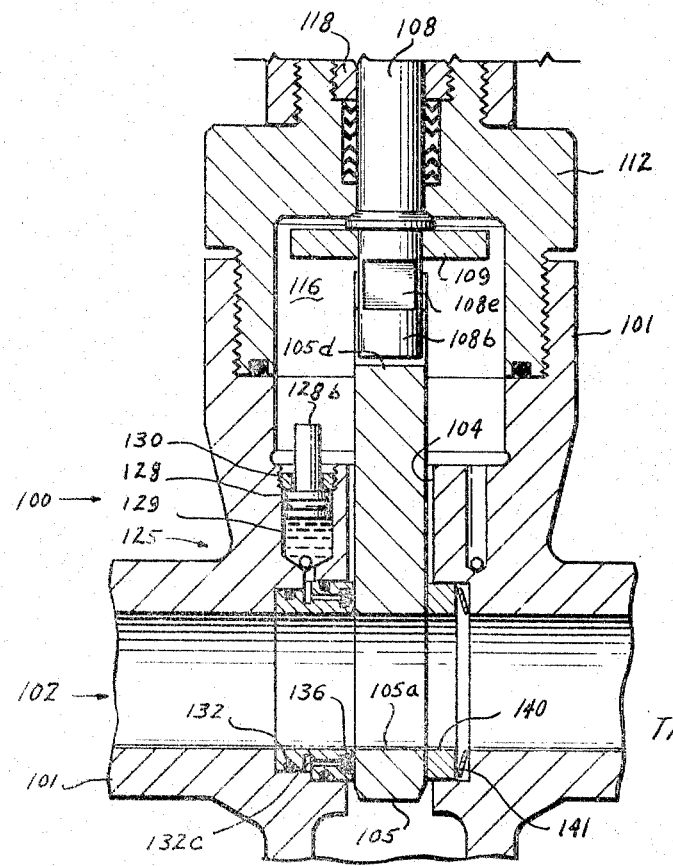

United States Patent Office 3,321,176
Patented May 23, 1967

3,321,176
CLOSED FLUID SYSTEM FOR SEALING VALVE CLOSURE ELEMENTS
Thomas J. Bolling, Jr., 4189 Bellaire Blvd., Suite 266, Houston, Tex. 77025
Filed Aug. 2, 1965, Ser. No. 479,035
7 Claims. (Cl. 251—172)

The present invention relates to valves, and more particularly, to a closed fluid system in the valve for maintaining an effective seal on the valve closure element when it is in closed position.

This is a continuation-in-part of an application filed Feb. 1, 1962, bearing Ser. No. 170,433, and now abandoned.

In valve constructions presently used, a great deal of difficulty is encountered in maintaining the valve closure element sealed within the valve when seated in closed position so as to inhibit leakage of fluid around the closure element from the upstream to the downstream side.

The present invention provides an arrangement whereby a positive sealing on the valve closure element may be effected when it is in closed position but which sealing arrangement does not bind or stick the closure element even though it may remain in closed position over a substantial period of time.

The present invention is also advantageous in that it can be adapted for use with various valves such as gate valves and plug valves and other types of valves.

An important object of the present invention is to provide a closed fluid receiving system in the valve which is closed relative to the fluid flow through the valve whereby the fluid in the closed system may urge a seal means against the valve closure element when it is in closed position to inhibit leakage in the valve.

An important object of the present invention is to provide a closed fluid receiving and retaining system which is closed relative to the fluid flow through the valve whereby the fluid in the closed system may urge a seal means against the valve closure element when it is in closed position to inhibit leakage in the valve, there being means for exerting a force on the fluid in the closed system as the valve closure element is moved to closed position.

A further object of the present invention is to provide a closed fluid receiving and retaining system within a valve having a valve element which closes the valve to fluid flow therethrough wherein a seal is seated against the valve element on completion of movement of the element to the closed position and which seal is also released from contact with the valve element prior to movement of the valve element on opening the valve of this invention.

An additional object of the present invention is to provide a closed fluid receiving and retaining system within a valve structure wherein the closed fluid receiving and retaining system positions seal receiving means adjacent the valve element and thereby provides means for preventing sliding contact between the valve element, the seal, and the seal receiving means.

Other objects and advantages of the present invention will become more readily apparent from a consideration of the following description and drawings, wherein:

FIG. 3 is a partial vertical sectional view of the gate valve shown in FIG. 1 for relating operation of a closed fluid receiving and retaining system of the present invention to FIG. 1;

FIG. 4 is another partial vertical sectional view similar to FIGS. 1 and 3 relating opertaion of the closed fluid receiving and retaining system of the present invention when the gate element is in the open position.

Figure 1:
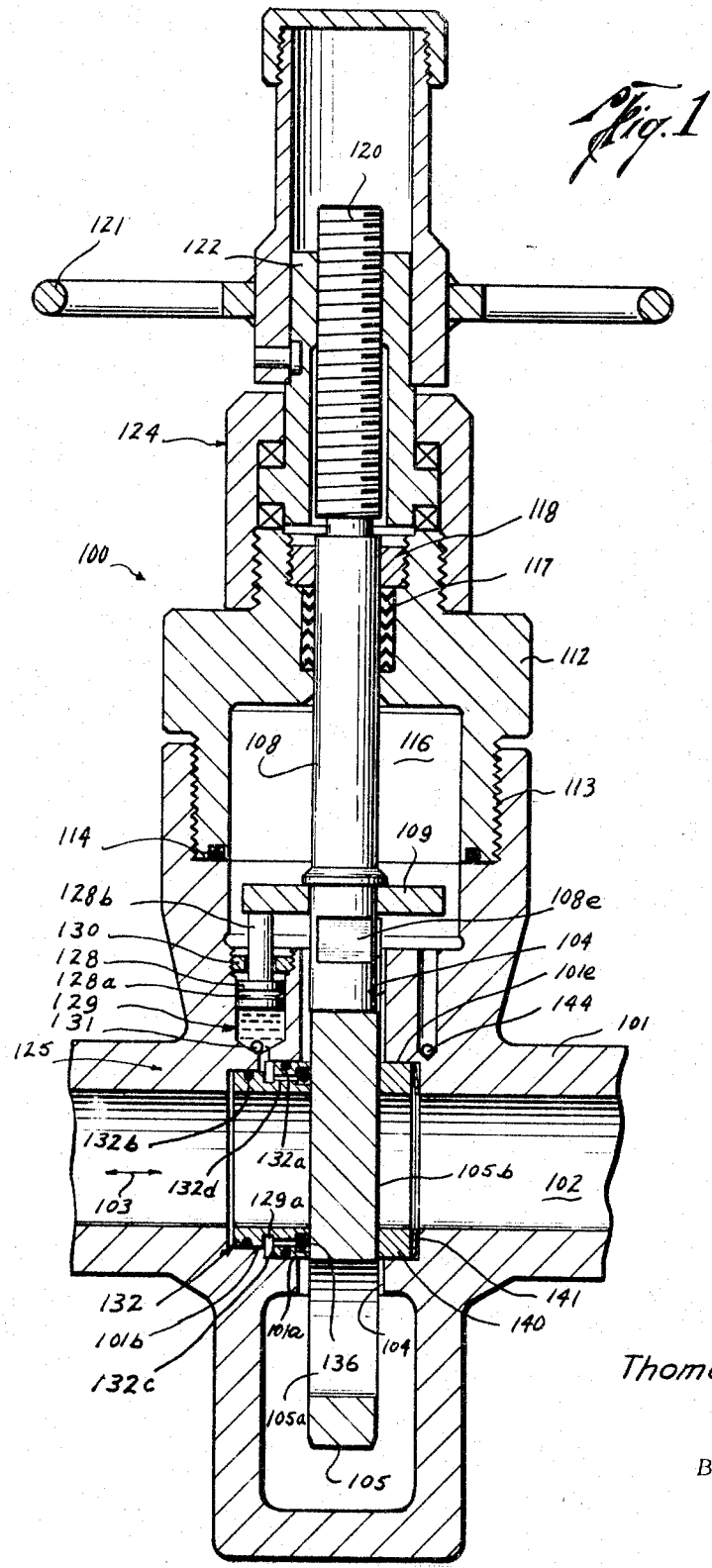
FIG. 1 is a vertical sectional view of an embodiment of the present invention in a gate valve.
Figure 2:
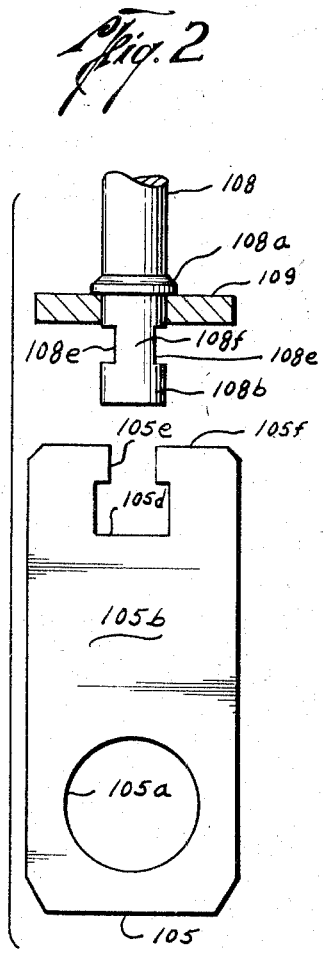
FIG. 2 is an exploded view illustrating the lower portion of the valve stem and the gate element whereby connective means provides lost motion therebetween for operation of the present invention and the embodiment illustrated in FIG. 1.

Attention is directed to an embodiment 100 of the present invention illustrated in vertical sectional view in FIGS. 1 and 2, which embodiment 100 includes the closed fluid receiving and retaining system of the present invention. The embodiment 100 includes a valve body designated generally at 101, a transverse bore 102 for receiving bidirectional flow therethrough as indicated by the arrow 103 and wherein the transverse bore 102 is intersected by a lateral bore 104 formed in the body 101. A gate element indicated generally at 105 is slidably received within the lateral bore 104, and it is provided with an opening 105a preferably of similar or even identical cross-section compared with the transverse bore 102 and also includes a blank face indicated at 105b.

FIG. 2 illustrates in greater detail the gate element 105 which is shown as including a T-slot 105d having a restricted portion 105e or neck for purposes to be described in greater detail hereinafter with the slot 105 centered with respect to the upper edge of the element 105. The T-slot 105d is adapted to receive by way of connective means to be discussed the lower end of a valve stem 108 which is shown in both FIGS. 1 and 2. Valve stem 108 includes an annular enlargement or shoulder 108a which is provided for abutting a preferably circular washer 109 received about the lower end of the valve stem 108 and carried against the enlargement 108a when the gate element 105 is engaged with the valve stem 108. The valve stem 108 is preferably cylindrical in construction at the lower end 108b and has formed therein a pair of chordal notches 108e, which notches are preferably spaced diametrically opposite one another so as to define a narrow neck or portion 108f which is fitted within the narrow portion 105e of the gate element on joining the valve stem 108 thereto. The lower portion 108b of the valve stem 108 is of greater diameter than the narrow channel 105e provided in the gate element 105 to prevent the valve stem from pulling free of the valve gate element 105 on relative upward motion thereto and is, of course, adapted to press against the T-slot 105d and urge the gate element 105 downwardly in response to the movement of the valve stem 108. The axial extent of the notches 108e exceeds the longitudinal extent of the narrow portion 105e of the T-slot 105d so as to provide lost motion on occurrence of relative movement of the valve stem 108 with respect to the gate element 105. In this regard, it should be noted that the lower end 108b of the valve stem 108 fits sufficiently loose in the T-slot 105d so as to not impede or hamper the lost motion; and the lower end 108b is preferably constructed and arranged to axially abut against the lower surface of the T-slot 105d simultaneously with the abutting contact provided by the notches 108e against the upper edge 105f as is illustrated in FIG. 1. The function of the lost motion provided by the element 105 and the valve stem 108 with the connective means provided therebetween will be described in greater detail hereinafter.

Referring again to FIG. 1, the valve stem 108 extends upwardly through a bonnet member 112 which is threadedly engaged at 113 with the valve body 101. A seal, such as an O-ring illustrated at 114, received within an appropriate seal receiving means, provides a leakproof connection at the threads 113 whereby the valve bonnet 112 and the valve body 101 define a leakproof chamber 116 through which the valve stem 108 extends. The valve stem 108 projects through the appropriate stuffing box means at 117 and is rotatably supported in the bonnet portion 112 by a stuffing net 118 received in the bonnet 112. The valve stem 108 is engaged with or integrally formed to a portion 120 which is threaded as shown in FIG. 1 and engaged by means well known with a hand wheel 121. The hand wheel 121 is connected by way of an internally threaded portion indicated at 122 which is rotatable with the hand wheel 121 and cooperates with the threaded stem portion 120 as a means for providing relative longitudinal motion of the valve stem 108 in response to rotational movement of the hand wheel 121 for opening and closing the valve gate element 105. Suitable bearing and sealing means are provided as indicated generally at 124.

As will be recognized by those skilled in the art, rotation of the hand wheel 121 moves the valve stem 108 longitudinally relative to the valve body 101 to open or close the gate element 105 with respect to the transverse bore 102. As found in conventional gates known to the prior art, rotation in a given direction moves the gate element 105 downwardly with respect to the lateral bore 104 and ultimately to the position such as illustrated in FIG. 1. However, unlike gate valves of the prior art, the present invention provides among other features a closed fluid receiving and retaining system indicated generally at 125 as will be presently described.

The projecting member 109 carried on the valve stem 108, preferably a circular washer or the like, which is rested on the upper surface 105f of the gate element 105 extends therefrom and moves with the valve stem 108 and is positioned to engage piston means indicated generally at 128. Piston means 128 is received within one end of the fluid passage means designated generally at 129 and maintains a leakproof relation therewith by virtue of a seal member 128a encircling the piston means 128, which seal is preferably a rubber O-ring or the like. The piston means 128 is secured within the fluid passage means 129 by a member 130 engaged with the threads formed at the end of the fluid passage means 129, and the member 130 provides guidance of the piston means 128 by way of an axially centered opening through which a projection 128b extends to contact the nether side of the means 109 for actuating movement of the piston means 128. The closed fluid receiving and retaining system indicated generally at 125 is charged by way of a fill passage shown at its termination 131 in FIG. 1 in the fluid passage means 129. Passage 131 communicates with the exterior of the valve body 101 and receives a plug (not shown) which is removable for purposes of servicing the liquid or other fluid in the fluid passage means 129.

The fluid passage means 129, while communicating at one end with the piston means 128, extends at its opposite end to annular seal receiving means indicated generally at 132. The means 132 is slidably received within an enlargement having the form of a pair of counterbores indicated at 101a and 101b which extend fully about and encircle the transverse passage 102, and which counterbores intersect the lateral bore 104 provided for the gate element 105. The seal receiving means 132 is slidably positioned therein and sealed with respect to the transverse fluid passage 102 by means of a pair of seal members, preferably O-rings, indicated at 132a in contact with counterbore 101a and a seal 132b in contact with the counterbore 101b. As will be appreciated, the seal receiving means 132 is slidable with respect to the valve body 101 but is sealed therewith by the sliding seal means described which prevents commingling of the fluid passing through the transverse bore 102 and the fluid in the closed fluid receiving and retaining system 125.

The fluid passage means 129 is communicated with the seal receiving means indicated at 132 and is, so to speak, distributed full thereabout by the passage 129a. Passage 129a is shown as defined by shoulder area means 132c preferably extending perpendicularly to the larger diameter portion of the seal receiving means 132; is also defined by the seal receiving means proper, and is delimited by portions of body 101 between the seal 132a and 132b. As recognized, the passage portion 129a is of variable cross-section depending on the position of the annular sliding seal receiving means 132 with respect to the valve body 101.

A plurality of feeder passages 132d is spaced circumferentially about the annular member 132 and the passage 129a through the sliding seal receiving member 132 to thereby communicate with the seal member 136 as illustrated. Seal member 136 is received within a slot formed in the face of the cylindrical seal receiving means 132 which slot is constructed and arranged relative to the seal member 136 to provide a recess for the seal member 136 in the absence of fluid pressure in the passage 129 as will be described hereinafter. Fluid pressure supplied through the feeder passage 132d acts uniformly on the rear face of the seal member 136 which is confined by the slot formed in the seal receiving means and urges the seal means 136 forwardly in the slot and into contact with the valve element 105 at its blank surface 105b as best shown in FIG. 1. The seal member 136 seals with both the seal receiving means 132 and the gate element 105 so as to maintain the fluid at its rear face within the closed fluid receiving and retaining system 125 while simultaneously bearing against the blank face 105b of the gate element 105 to effect a seal therewith. As will be described in greater detail, the sliding means 132 moves in response to fluid pressure in the fluid passage means 129 and is contacted against the blank face 105b of the gate element 105; and thereafter the seal means 136 is actuated in response to pressure in the fluid passage means 129 to sealingly contact and cooperate with the gate element 105 to provide a seal against exceedingly high pressures of fluid in the transverse bore 102 without regard to the direction of flow as indicated by the arrow 103.

The seal receiving means 132 acts on one of the blank faces 105b of the gate element 105, while the opposite face is contacted by a cylindrical member 140 which is received within a counterbore 101e. The cylindrical member is positioned adjacent the gate element 105 by means of a Belleville spring 141 which has an outer edge warped to resiliently act on the cylindrical member 140 to urge same toward the gate element 105. The spring 141 acts on the cylindrical member 140 for only a relatively short distance to move same toward the gate element 105 to urge the gate toward the sliding seal receiving means 132. It should be noted in FIG. 1 that the gate element 105 is slidable to the left and right with respect to the valve stem 108 and is also permitted some freedom of movement in the lateral bore 104 which provides a sliding fit for receiving the gate element therein. As will be described in relating operation of the present invention, the movement provided at the urging of the spring 141 acts through the cylindrical member 140 to assist in maintaining a leakproof seal when closing the gate element 105 in the transverse bore 102.

The somewhat loose fit of the gate element 105 in the lateral bore provides possible access to fluids within the transverse bore 102 into the chamber 116 defined by the body 101 and the bonnet 112. The presence or absence of fluids in the chamber 116 is not material to the operation of the present invention although the preferred embodiment 100 illustrated in FIG. 1 does include therewith a bleed hole 144 which opens into the chamber 116 and serves as one form of means for bleeding the chamber 116 should the valve be disassembled and reassembled and other maintenance performed thereon. Those schooled in the art will appreciate that the bleed passage 144 is sealed by appropriate and well-known means (not shown) to prevent leakage from the valve 100.

FIGS. 1, 3, and 4 may be considered together to illustrate the sequence of operation of the valve 100 which incorporates the closed fluid receiving and retaining system 125 of this invention. The valve 100 is shown in FIG. 3 in a preliminary position wherein compression of the fluid in the closed fluid receiving and retaining system 125 is released upon initial movement of valve stem 108, and the view of FIG. 4 illustrates the valve 100 in the fully opened position with the valve element fully withdrawn from the transverse passage 102.

In FIG. 1, means are illustrated on the valve stem 108 which are contacted against the piston means 128 for engaging and moving same in one end of the fluid passage means 129. The movement of the piston means 128 in fluid passage means 129 compresses the fluid maintained therein and increases the pressure in the encircling portion 129a of the passage 129. The compression of fluid in the passage means 129 increases the pressure acting on the shoulder area surface means 132c to move the seal receiving means 132 against the gate element 105 before the fluid pressure is effective on the seal member 136. The seal receiving means 136 is urged against the blank face 105b of the gate element 105, and the compressive force provided by the fluid in the passage means 129 is reacted against the resilient force provided by the Belleville spring 141 on the opposite side of the gate element 105. As shown in FIG. 1, the seal receiving means is slidably mounted within the counterbores provided in the transverse bore 102 and such movement results in the gap illustrated in FIG. 1 at the end of the means 132 opposite from the gate element 105.

In the position shown in FIG. 1, the Belleville spring 141 functions to urge the gate element 105 into contact with the seal receiving means 132, and in cooperation with the closed fluid system 125, is able to seat the blank face 105b and the end faces of the seal receiving means 132 prior to the sealing of the seal ring 136 to prevent extrusion of the seal when the closed fluid system 125 is fully pressurized. It will be recognized that the sliding and possibly grating movement of the two above-mentioned members is avoided to obviate complex machining requirements such as lapping and honing the bank face 105b of the gate element, and the invention also increases the life of the two above-mentioned components so as to reduce the possibility of leakage of the valve 100.

Once the gate 105 is positioned to properly contact the seal receiving means 132, a further slight axial movement of valve stem 108 further compresses the fluid in the closed fluid receiving and retaining system 125 and acts on the recessed face of the seal member 136 to urge same along its slot in the means 132 and into sealing contact with the face 105b of the gate element 105. On completed movement of the seal member 136 to the full sealing position in response to pressure in the closed fluid system 125, the valve 100 is effectively sealed in a closed position; and it should be noted that the seal provided thereby is suitable for interrupting fluid flow resulting in pressure differentials in either direction of the transverse bore 102. Because the gate element 105 is positioned across the transverse bore 102 and maintains a sealed relationship with respect to the body 101, and more particularly with respect to the valve seal means 132, it matters not in closing the valve 100 whether or not the pressure flow in the transverse bore is from left to right or right to left as viewed in FIG. 1.

Attention is directed to FIG. 3 which illustrates the valve 100 in a slightly different structural relationship when compared to the illustration of FIG. 1. More specifically, FIG. 3 indicates that the valve stem 108 has been retracted upwardly slightly wherein the connective means provided between the valve stem 108 and the gate element 105 provides lost motion. The lost motion is specifically illustrated by comparison with FIG. 1 wherein the lower surface of the T-slot 105d is contacted against the lower end of valve stem 108, whereas FIG. 3 indicates separation therebetween. The valve stem is lifted relative to the element 105 by an amount equal to the lost motion provided by the previously described notches 108e provided in the lower end of the valve stem 108 and engagement thereof with the slot 105d provided at the upper end of the gate element 105.

FIG. 3, as mentioned above, illustrates the piston 128 moved to its uppermost position and contacted against the plug member 130 provided in the fluid passage 129. This movement relieves pressure acting in the encircling passage 129a and permits the seal receiving means 132 to back off from the gate element 105 in response to the urging of the Belleville spring 141 provided on the opposite face of the gate element 105. Also, the seal member 136 is relieved of the compressive force acting on its recessed face and the sealing contact provided with gate element 105 is interrupted since it is dependent on the normal force created by the closed fluid system 125. It should be noted that the gate element 105 and cylindrical member 140 are shifted toward the member 132 and urge same axially of the counterbores 101a and 101b provided about the transverse bore 102 for receiving the member 132.

Attention is next directed to the fully opened position shown in FIG. 4 wherein the valve stem 108 has been operated to slidingly move the valve gate element 105 in the lateral bore 104 and to position the opening 105a at the lower end of the element 105 in preferably coaxial relationship to the transverse bore 102. The gate is freed to move to the open position without damaging the face 105b resulting from frictional contact of close fitting parts, it being kept in mind that preferably normal forces are utilized to maintain a fluid seal against the very high pressures in bore 102.

FIGS. 1, 3, and 4, in that sequence, illustrate relative positions of the parts of the valve 100 in operation of the valve 100 from the fully closed position to the fully opened position. If FIGS. 1, 3, and 4 are considered in reverse order, FIG. 4 shows the fully opened position; FIG. 3 provides an intermediate condition prior to sealing with the gate element 105; and FIG. 1 shows the fully closed valve.

The present invention utilizes connective means to provide lost motion wherein the closed fluid receiving and retaining system 125 of the present invention is compressed or decompressed prior to movement of the gate element by the use of the lost motion.

While little has been said concerning the materials used in fabrication of the present invention, it should be mentioned that the various O-rings, seal members, or the like provided may be of conventional rubber O-ring fabrication, or may even be made of other materials such as metal or the like. The fluid provided for the closed fluid system 125 can be liquid, semiliquid, or even an elastomer. As mentioned hereinbefore, the closed fluid system 125 is charged with a selected fluid through the port 131 opening through the valve body 101 and is sealed to the fluid flow through the transverse bore 102. Thus, the closed fluid system 125 can be charged and sealed; and the valve 100 is thereafter suitable for conducting fluids of any description, including gases, and liquids having constituents tending to settle out. This is particularly important since the valve 100 is adaptable for use with fluids such as drilling muds or the like which tend to settle out and are not acceptable for use in the closed fluid system 125.

Broadly, the present invention relates to a closed fluid receiving and retaining system independent of pressures in a valve whereby sealing of the valve is effected by the closed fluid system to maintain a leakproof connection, and the seal member is relieved of pressure before moving the valve element on opening or closing the valve.

What is claimed is:

1. In a valve including a body having a transverse bore for fluid flow therethrough and having a lateral bore intersecting the transverse bore for receiving therein a gate element for closing and opening the transverse bore to fluid flow and a movable valve stem extending into the body and connected to the element for opening and closing the transverse bore to fluid flow on relative movement of the element in the lateral bore, the improvement comprising:

(a) seal receiving means received in an enlargement in the body encircling the transverse bore and spaced from the lateral bore;
(b) slidable seal means cooperating between said seal receiving means and the body for sealing therebetween as said seal receiving means slides relative to the lateral bore and element therein;
(c) a seal member carried in said seal receiving means;
(d) fluid passage means communicating with said seal member through said seal receiving means;
(e) shoulder area means formed on said seal receiving means and facing from the lateral opening, said means being communicated with said fluid passage means;
(f) piston means received in one end of said fluid passage means to close off same and form a closed fluid receiving and retaining system, said system receiving and retaining fluid therein for compression by said piston means;
(g) means carried on the stem for actuating and moving said piston means on moving the element in the lateral bore toward a closed position, said piston means compressing fluid in said closed fluid receiving and retaining system to act on said shoulder area means and move said seal receiving means into contact with the element in the closed position; and
(h) said piston means also compressing fluid in said closed fluid receiving and retaining system to act on said seal member and sealingly urge same into contact with the element to close the valve.

2. The invention of claim 1 wherein contact of said seal member under urging of compressed fluid in said closed fluid receiving and retaining system with the element resists pressure differential in the valve acting in either direction.

3. The invention of claim 1 wherein the valve stem is engaged with the element by connective means for accommodating preliminary movement of the valve stem on opening the element from the closed position wherein the element has closed the transverse passage to fluid flow therethrough and wherein the preliminary movement releases compression in the closed fluid receiving and retaining system whereupon said seal member sealingly disengaged from the element prior to movement of the element from the closed position in the transverse bore.

4. The invention of claim 1 including resiliently yieldable means for relatively urging said seal receiving means and the element toward one another prior to compressing fluid in said closed fluid receiving and retaining system to sealingly contact said seal member to the element.

5. In a valve including a body having a transverse bore for fluid flow therethrough and having a lateral bore approximately perpendicular to the transverse bore for receiving a slidably movable gate element therein to close the transverse bore to fluid flow, and a movable valve stem in the body connected to move the element in the transverse bore for closing and opening the valve, the improvement comprising:

(a) seal receiving means opposite the element when in the closed position relative to the transverse bore for extending about the transverse bore;
(b) a seal member placed in said seal receiving means and defining therewith a leakproof relationship;
(c) fluid passage means communicating with said seal member through said seal receiving means;
(d) piston means received in one end of said fluid passage means to close off same and form a closed fluid receiving and retaining system communicating with and acting on said seal member to sealingly engage same about the transverse bore when the element is in the closed position in the transverse bore;
(e) means actuated by movement of the stem on closing the element in the transverse bore for actuating and moving said piston means in said passage means to act on said seal member to thereby form a leakproof relationship between said seal member and the element;
(f) connective means engaging the valve stem with the element for accommodating preliminary movement of the valve stem in opening the valve from a closed position wherein the element has closed the transverse passage to fluid flow therethrough and wherein the preliminary movement actuates the actuated means to disengage said piston means whereupon said seal member is sealingly disengaged from the element prior to movement of the element from the closed position relative to the transverse bore; and
(g) said seal receiving means being carried in the body and extending fully about the transverse bore adjacent the lateral bore, and including seal means providing a leakproof relationship between said seal receiving means and the body, said seal receiving means being slidably received in the body for moving relatively toward the element for contacting said seal member therewith in response to actuation of the last named means on engaging and moving said piston means relative to said closed fluid receiving and retaining system.

6. In a valve including a body having a transverse bore for fluid flow therethrough and having a lateral bore approximately perpendicular to the transverse bore for receiving a slidably movable gate element therein to close the transverse bore to fluid flow, and a movable valve stem in the body connected to move the element in the transverse bore for closing and opening the valve, the improvement comprising:

(a) seal receiving means opposite the element when in the closed position relative to the transverse bore for extending about the transverse bore;
(b) a seal member placed in said seal receiving means and defining therewith a leakproof relationship;
(c) fluid passage means communicating with said seal member through said seal receiving means;
(d) piston means received in one end of said fluid passage means to close off same and form a closed fluid receiving and retaining system communicating with and acting on said seal member to sealingly engage same about the transverse bore when the element is in the closed position in the transverse bore;
(e) means actuated by movement of the stem on closing the element in the transverse bore for actuating and moving said piston means in said passage means to act on said seal member to thereby form a leakproof relationship between said seal member and the element;
(f) connective means engaging the valve stem with the element for accommodating preliminary movement of the valve stem in opening the valve from a closed position wherein the element has closed the transverse passage to fluid flow therethrough and wherein the preliminary movement actuates the actuated means to disengage said piston means whereupon said seal member is sealingly disengaged from the element prior to movement of the element from the closed position relative to the transverse bore; and
(g) yieldable means acting on the element to urge same toward said seal receiving means to co-operate therewith to confine said seal member on forming a leakproof relationship therewith.

7. The invention of claim 5 wherein said seal receiving means includes a shoulder area open to said closed fluid receiving and retaining system wherein said shoulder area is urged relatively toward the element by said closed fluid receiving and retaining system on actuation of the last named means.

References Cited by the Examiner

UNITED STATES PATENTS

| | | |
|---|---|---|
| 1,839,092 | 12/1931 | Feldmeier. |
| 2,567,032 | 9/1951 | Schmidt _____ 251—160 X |
| 2,660,397 | 11/1953 | Volpin _____ 137—246.12 |
| 2,726,842 | 12/1955 | Seamark _____ 251—172 |
| 2,825,528 | 3/1958 | Truitt _____ 251—187 X |
| 2,865,597 | 12/1958 | Lucas _____ 251—187 |
| 3,034,760 | 5/1962 | Henrion _____ 251—173 |
| 3,095,004 | 6/1963 | Jackson _____ 251—172 X |

CLARENCE R. GORDON, *Primary Examiner.*

WILLIAM F. O'DEA, *Examiner.*